United States Patent Office 3,438,884
Patented Apr. 15, 1969

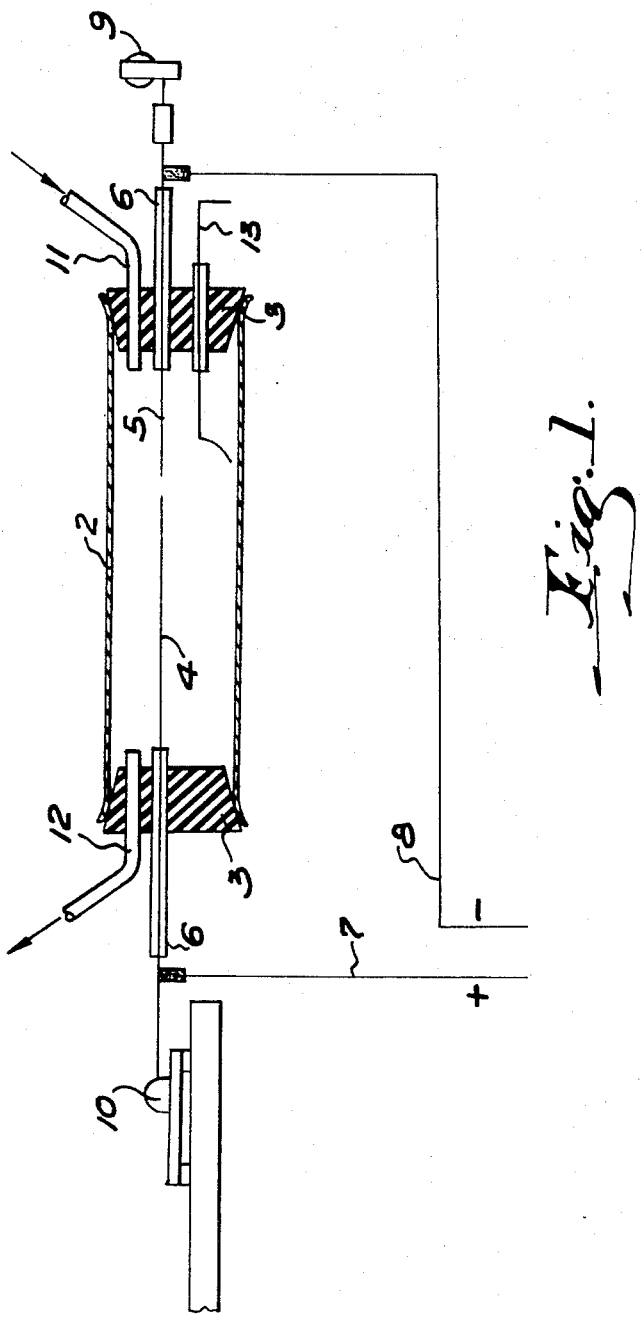

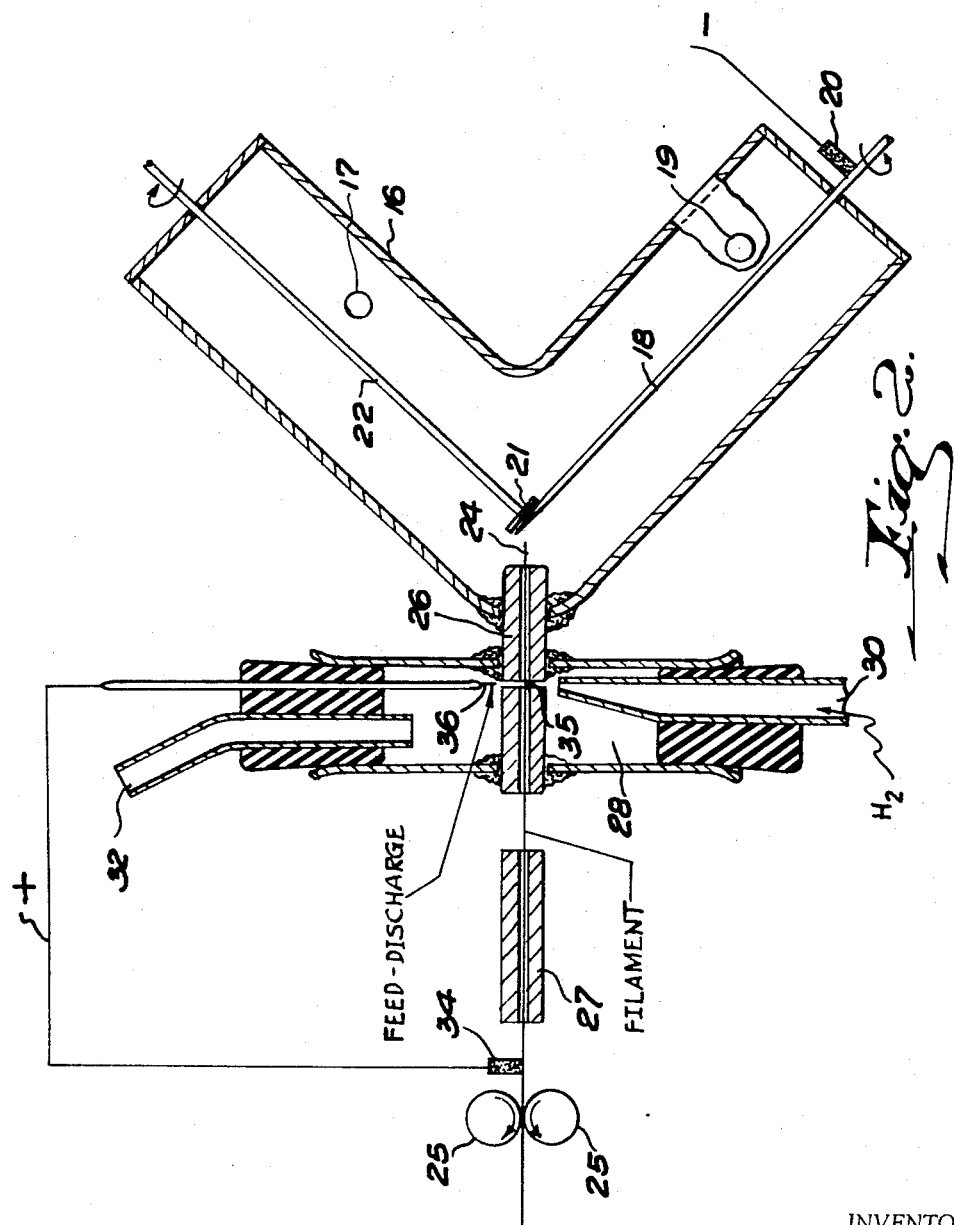

3,438,884
PREPARATION OF BORON FILAMENTS IN AN ELECTRICAL DISCHARGE
Arvo J. Juhola, Pittsburgh, and Thomas A. Pferdehirt, Evans City, Pa., assignors to Mine Safety Appliances Company, a corporation of Pennsylvania
Filed Oct. 17, 1966, Ser. No. 587,154
Int. Cl. C22d 7/00; C01b 35/00
U.S. Cl. 204—164
14 Claims This invention relates to a method and apparatus for the preparation of boron filaments.

Boron filaments are especially desirable for aerospace applications because of their high tensile strength, high modulus of elasticity and low density at both ordinary and high temperatures. Heretofore, composite filaments of boron deposited on a metal substrate have been available, but in such filaments weaknesses occur at the interface of the substrate and the boron, and, especially in small diameter filaments, the filament density is high due to the heavy metal substrate. There is, therefore, a need for a boron filament that has no metal substrate.

It is an object of this invention to provide a filament of uniform composition formed of essentially pure boron. Another object is to provide a method of making such a filament utilizing an electrical discharge. Another object is to provide an apparatus for preparing such filaments. Other objects will be apparent from the following description and claims.

In the accompanying drawings,

FIG. 1 is a schematic illustration of an apparatus suitable for practicing the method of this invention; and FIG. 2 is a plan view partly in section of an apparatus of this invention for the manufacture of continuous lengths of boron filament.

In accordance with this invention, a gas mixture of hydrogen and boron trichloride, $BCl_3$, with or without a minor amount of diborane, $B_2H_6$, is subjected to a direct current thermionic arc discharge between spaced electrodes to form a boron filament on the positive electrode. The positive electrode is a metal point electrode, preferably having a diameter at its end no larger than the diameter of the boron filament desired to be formed and suitably made of any high melting metal, such as tungsten. The negative electrode is preferably pointed and made of high melting metal (but may be considerably larger than the positive electrode). After the initial formation of boron filament, the boron filament itself acts as the positive electrode, defining the discharge gap with the negative electrode. The positive electrode is moved away from the negative electrode at substantially the same rate as boron filament is formed so that a substantially constant discharge gap is maintained.

We have found that satisfactory high strength boron filaments are formed only if the electrical discharge is a thermionic arc discharge. The thermionic arc discharge is well known in the art; it is a self-sustaining arc that has a high current density at a comparatively low voltage and has a falling volt-ampere characteristic. For the purpose of this invention, wherein boron filaments of between about 1.5 and 4 mils are formed, a discharge current of between about 2 to 6 milliamperes results in a thermionic arc discharge.

Suitable boron source gases for use in this invention are mixtures of hydrogen and boron trichloride, and such mixtures containing a minor amount of diborane, suitably less than about 5 mol percent. Mixtures containing at least about 50 mol percent hydrogen are preferred, most suitably mixtures containing 55–80 mol percent hydrogen and 20–45 mol percent boron trichloride. The strongest filaments are obtained when the mixture contains between about 30–45% $BCl_3$. The gas pressure is not critical, so long as the pressure is sufficient to support a thermionic arc, suitably above about 100 mm. of Hg. Superatmospheric pressure of several atmospheres, e.g. 5 atmospheres, may be used if desired. Preferably, substantially atmospheric pressure is used as it is most convenient and there is no apparent advantage in using higher or lower pressures. Variations of the bulk gas temperature in the reactor, or the temperature of the gas fed to the reactor, does not noticeably affect the reaction that is localized in the electrical discharge field; however, the temperature should be kept below that at which the gas thermally pyrolyzes or reacts, suitably below about 600° C. in the case of hydrogen-boron trihalide mixtures and below about 200° C. in the case of gas mixtures containing diborane.

Although the boron source gas may be static in the discharge chamber, it is preferred, for extended reactions, to flow the boron source gas through the reactor to provide continuous replenishment of boron source gas to the discharge. The gross residence time of the boron source gas in the discharge chamber is not critical, but wide variations in residence time may affect the rate of filament growth. It has been found to be particularly advantageous to maintain a flow rate such that less than about 10% of the supplied boron is converted to elemental boron by the discharge.

Any D.C. current source may be used to produce high strength filaments, but we have found that D.C. currents with a superimposed radio-frequency ripple produces superior filaments and that the strongest filaments are obtained when using a low frequency pulsating D.C. current, suitably 60–600 c./sec. pulsating D.C. Most conveniently, the D.C. current is provided by rectifying 50–60 cycle A.C.

Illustrative of this invention are preparations of boron filaments using the apparatus schematically illustrated in FIG. 1. Referring to FIG. 1, the reactor 2 consists of a 6" length of 1½" bore glass tubing closed with rubber stoppers 3. A tungsten filament positive electrode 4 and a spaced negative electrode 5 are inserted in the reactor through glass tubes 6 and connected by leads 7 and 8 to a D.C. power source. The negative electrode is coupled to drive motor 9 that rotates it, suitably at 600 r.p.m., and the positive electrode is coupled to drawing shoe 10, that moves the positive electrode away from the negative electrode at the desired rate. The reactor is flushed with nitrogen and then a mixture of boron trichloride and hydrogen is introduced to the reactor through inlet 11. The gases are discharged from the reactor at outlet 12 for recycle to recover unreacted gases by conventional methods. The electrodes are initially close together, suitably about ½ mm. and sufficient voltage is applied to produce a thermionic arc discharge. The electrode spacing can then be adjusted to the desired distance, suitably 1 to 3 mm., but in any event to provide a gap small enough to permit the thermionic discharge. The boron filament forms on the positive electrode (this becoming the electrode) and the electrode is withdrawn at a rate to maintain a substantially constant discharge gap. In order to draw a filament the positive electrode must be a filament electrode, suitably a 30 mil tungsten rod tapered to a point. The negative electrode is preferably also pointed, but may be more blunt than the positive electrode, as a loose massive deposit of boron forms on the negative electrode regardless of its shape. A scraper or trimmer 13 is provided to remove the boron deposit after each filament drawing thereby preventing the build-up of a deposit on the negative electrode. About 20–30% of the boron produced in the discharge is in the filament and the remainder is the deposit on the negative electrode. When starting the discharge with tungsten electrodes, a potential of 300–500 volts is generally sufficient. Since the boron filaments has a very high electrical resistance, the potential must be increased as the filament is formed to maintain the desired current flow. Table I, illustrative of the potential requirements, when drawing about a 2 mil boron filament. The slight decrease of the current at higher voltages is characteristic of the particular power source used and, of course, higher capacity power sources can be selected to provide a constant current flow with various resistances.

TABLE I

| Filament Length (inches) | Applied Potential (Volts) | Current (Milliamps) |
|---|---|---|
| 0 | 500 | 6.0 |
| ¼ | 1,000 | 5.8 |
| ½ | 1,500 | 5.6 |
| 1 | 1,800 | 5.5 |
| 1½ | 2,100 | 5.4 |
| 2 | 2,200 | 5.3 |
| 2½ | 2,400 | 5.2 |

Table II sets forth a number of filament preparations using technical grade $BCl_3$ and hydrogen gas mixtures and a Spellman Model PN–30 power source, a 70 k.c. A.C. rectified and filtered source that provided steady D.C. with a 70 kc. superimposed ripple at currents above about 2 milliamps, as observed by oscilliscope included in the circuit. The filament formed in runs 1, 2 and 8 broke when handled so the tensile strength could not be measured; such fragile filaments are obtained with mixtures having less than about 20 mol percent $BCl_3$, while the strongest filaments are obtained using mixtures containing 30–45% $BCl_3$.

Comparable filaments are obtained when using either technical grade $BCl_3$, that contains about 0.7% phosgene, $COCl_2$, or ultra pure commercially available to $BCl_3$ in which the phosgene content has been reduced to less than about 0.06%.

TABLE II

| Run | Feed Gas | | | Drawing Rate (ft./hr.) | Current (Milliamps) | % of $BCl_3$ Converted to Boron | Filament | |
|---|---|---|---|---|---|---|---|---|
| | $BCl_3$ Flow (cc./min.) | $H_2$ Flow (cc./min.) | Mol percent $BCl_3$ | | | | Diameter [1] (Mils) | Tensile Strength, p.s.i. |
| 1 | 2 | 41 | 5 | 0.5 | 5.5 | 20 | | (2) |
| 2 | 6 | 41 | 13 | 0.5 | 5.5 | 16 | | (2) |
| 3 | 13 | 41 | 24 | 2 | 5.5 | 10 | | 140,000 |
| 4 | 22 | 41 | 35 | 10 | 5.5 | 8 | | 160,000 |
| 5 | 32 | 41 | 44 | 10 | 5.5 | 7 | | 155,000 |
| 6 | 43 | 41 | 51 | 10 | 5.5 | 6 | | 135,000 |
| 7 | 55 | 41 | 57 | 5 | 5.5 | 5 | | 40,000 |
| 8 | 22 | 120 | 15 | 0.6 | 5.5 | | | (2) |
| 9 | 22 | 59 | 27 | 10 | 5.5 | | 1.9 | 165,000 |
| 10 | 22 | 41 | 35 | 10 | 5.5 | | 2.3 | 2200,00 |
| 11 | 22 | 30 | 42 | 10 | 5.5 | | 2.0 | 213,000 |
| 12 | 22 | 27 | 45 | 10 | 5.5 | | 2.1 | 135,000 |
| 13 | 11 | 24 | 35 | | 5.9 | | 2.0 | 195,000 |
| 14 | 22 | 41 | 35 | 10 | 5.9 | | 2.3 | 9,01000 |
| 15 | 40 | 73 | 35 | | 5.9 | | 2.3 | 166,0p0 |
| 16 | 31 | 41 | 43 | 13 | 5.6 | | 1.9 | 231,000 |
| 17 | 52 | 73 | 42 | 13 | 5.7–6 | | 1.9 | 227,000 |

[1] Average value of from 4 to 10 samples. [2] Unmeasurable.

A thermionic arc can be obtained and filaments drawn with currents as low as about 2 milliamps, but stronger filaments are obtained if a current of above about 3.5–4.0 milliamps is used. If currents above about 6.5 milliamps are used, there is premature decomposition of the gas mixture, evidenced by boron soot appearing in the vapor phase, and satisfactory filaments cannot be drawn. It is preferred to use currents below about 6.0 milliamps.

Although any D.C. power source can be used, to produce useable high strength filaments, power sources providing certain current characteristics unexpectedly produce filaments of exceptionally high strength. To illustrate the effect of current characteristics, filaments were prepared as described above using hydrogen and $BCl_3$ mixtures containing 43 mol percent $BCl_3$, a drawing rate of 7 ft./hr. and an average current of 5 milliamps, with various power sources. When using a steady D.C. with no ripple, provided by a D.C. power unit equipped to rectify and filter 60-cycle A.C. current, a 3.2 mil filament was obtained having a tensile strength of 144,000 p.s.i. When using a pulsating D.C. current having 140,000 pulse/sec., provided by the above mentioned Spellman power source with the filter removed, a 2.7 mil filament was obtained having a tensile strength of 157,000 p.s.i. When using a steady D.C. having a superimposed 70,000 c./sec. ripple, provided by the above mentioned Spellman power source, a 2.7 mil filament was obtained having a tensile strength of 233,000 p.s.i. When using a 120 pulse/sec. pulsating D.C. current, provided by rectifying 60 c./sec. A.C., a 1.7 mil filament was obtained having a tensile strength of 328,000 p.s.i.

Although the foregoing examples are directed to the use of $H_2$–$BCl_3$ mixtures, a gas mixture containing a minor amount of diborane, suitably not more than about 5 mol percent diborane may be used if desired. For example, filaments with a tensile strength of about 210,000 p.s.i. were made using a flow rate of 32 cc./min. of $BCl_3$, 48 cc./min. of hydrogen and from 0.5 to 2 cc./min. of $B_2H_6$, and an arc current of 5.2–5.4 milliamps.

It is preferred to rotate one electrode, as the rotation of the cathode in the foregoing examples, as straighter filaments are produced; however, filaments can be drawn with non-rotating electrodes.

Referring now to FIG. 2, there is illustrated a preferred apparatus for the manufacture of indefinite lengths of boron filament. Because of the extremely high electrical resistance of boron filaments, especially when cold, there is considerable power loss if any subtsantial length of filament is included in the electrical discharge circuit, and much higher voltage power sources are needed to provide the necessary voltage for the discharge. It is a feature of this apparatus that the power is supplied to the boron filament anode by an electric discharge. Another feature of the apparatus is the arrangement of electrodes and cathode trimmer.

The L-shaped reactor 16 has a bottom gas inlet 18 and a top gas outlet 17. Negative electrode 19 is coupled to drive shaft, not shown, by which it is rotated and is connected to the negative terminal of a power source, not shown, through carbon brush 20. Scraping disc or trimmer 21 is mounted on shaft 22 rotated by a drive shaft, not shown, at acute angle, suitably about 5°, with the negative electrode and almost touching the electrode. The boron deposit on the negative electrode is removed as it is formed by scraping of the rotating electrode with the rotating scraper. The boron thus removed can be left to accumulate in the reactor so long as it does not mechanically interfere with the electrodes or scraper; it may then be manually removed or discharged through a bottom hatch in the reactor.

The positive electrode 24 is drawn by drawing rolls 25 through a close fitting tube 26 that serves as an outlet for the reactor and an inlet to chamber 28 and through the close fitting tube outlet from chamber 28 that is in alignment with tube 26, and if desired, supporting tube 27. Hydrogen gas is flowed through chamber 28, via inlet 30 and outlet 32 at a slow rate sufficient to maintain a substantially pure hydrogen atmosphere in the chamber. The positive terminal of the power source is connected to the positive electrode through carbon brush 34 and is also connected to electrode 36 in chamber 28.

In commencing the preparation of a filament, the electrode 24 is a metal wire, such as tungsten, sufficiently long to engage the filament drawing rolls, or preferably, a metal wire having a short tip of boron filament cemented to it. In some instances, boron filament separates from the metal wire when cooled after removal from the reaction zone, while the preferred starting electrode having a boron filament tip does not so separate. Because of the low electrical resistance of the metal, the current flow from the electrical discharge is entirely through electrode 24. As boron filament is formed by the discharge and the electrode is withdrawn, a progressively longer length of electrode 24 will be the boron filament, having a high electrical resistance, thus progressively increasing the resistance of the power supply circuit through the electrode. When this resistance increases to a point that the voltage drop through electrode 24 is equal to that required to cause a discharge across the gap 35 between electrode 36 and boron filament 24, such a discharge occurs to provide a current flow to the electrode 24. The discharge across gap 35, occurring in a hydrogen atmosphere, is a high current discharge and causes no change or reaction with the boron filament. The discharge gap 35 is located close to the end of electrode 24, suitably about 1¼ inches. It is not practical to locate a brush or mechanical sliding contact so close to the end of electrode 24 because the freshly formed boron filament is very hot and would cause rapid deterioration of any mechanical contact. Thus it will be seen that by use of the hydrogen discharge to provide current for the discharge in reactor 16, boron filaments of any length can be formed continuously.

Although not intended to be limited by any theory, it is applicants' belief that the filament is formed primarily by a thermal reaction in the thermionic arc discharge as the amount of boron produced is several times that expected from a purely electrical phenomenon.

According to the provisions of the patent statutes, we have explained the principle and mode of practicing our invention and have described what we now consider to represent its best embodiment. However, we desire to have it understood that, within the scope of the appended claims, the invention may be practiced otherwise than as specifically described.

We claim:

1. A method of preparing a boron filament comprising the steps of subjecting a gas consisting essentially of a mixture of hydrogen and boron trichloride and from 0 to about 5 mol percent diborane, said gas mixtures containing not less than about 50 mol percent hydrogen, to a direct current thermionic arc electrical discharge between spaced positive and negative electrodes whereby a filament forms on said positive electrode, and moving said positive electrode away from said negative electrode at a rate such that the space between said electrodes is substantially constant.

2. A method according to claim 1 in which the gas consists essentially of a mixture of hydrogen and boron trichloride containing from about 20–45% boron trichloride.

3. A method according to claim 1 in which the direct current is a pulsating direct current having between about 60 and 600 pulses per second.

4. A method according to claim 1 in which the direct current is a steady direct current having a superimposed RF ripple.

5. A method according to claim 1 in which the gas pressure is substantially atmospheric and the electrodes are spaced from about 1 to 3 millimeters.

6. A method according to claim 1 in which the discharge current is between about 2 and 6 milliamperes.

7. A method according to claim 2 in which the direct current is a pulsating direct current having an average current flow of between about 2 and 6 milliamperes.

8. A method according to claim 7 in which the pressure is substantially atmospheric.

9. A method according to claim 8 in which the electrodes are spaced from about 1 to 3 millimeters.

10. A method according to claim 9 in which the average current flow is above about 4 milliamperes.

11. A method according to claim 2 in which the current is a steady direct current having a superimposed RF ripple and having an average current flow of between about 2 and 6 milliamperes.

12. A method according to claim 11 in which the pressure is substantially atmospheric.

13. A method according to claim 12 in which the electrodes are spaced from about 1 to 3 millimeters.

14. A method according to claim 13 in which the average current flow is above about 4 milliamperes.

References Cited

UNITED STATES PATENTS

| | | | |
|---|---|---|---|
| 3,086,847 | 4/1963 | Schott | 23—209 |
| 3,160,476 | 12/1964 | Sirtl | 23—209 |
| 3,386,909 | 6/1968 | Hough | 204—164 |

ROBERT K. MIHALEK, *Primary Examiner.*

U.S. Cl. X.R.

23—209; 65—1; 117—93.1